(12) United States Patent
Koshimoto et al.

(10) Patent No.: US 8,664,808 B2
(45) Date of Patent: Mar. 4, 2014

(54) LINEAR MOTOR COIL ASSEMBLY WITH COOLING DEVICE

(75) Inventors: Hiroshi Koshimoto, Ishikawa (JP);
Satoru Tajima, Ishikawa (JP)

(73) Assignee: Sodick Co., Ltd., Kanagawa (JP)

( * ) Notice: Subject to any disclaimer, the term of this patent is extended or adjusted under 35 U.S.C. 154(b) by 433 days.

(21) Appl. No.: 13/124,358

(22) PCT Filed: Oct. 23, 2009

(86) PCT No.: PCT/JP2009/005604
§ 371 (c)(1),
(2), (4) Date: Apr. 14, 2011

(87) PCT Pub. No.: WO2010/047129
PCT Pub. Date: Apr. 29, 2010

(65) Prior Publication Data
US 2011/0198946 A1   Aug. 18, 2011

(30) Foreign Application Priority Data
Oct. 23, 2008   (JP) ................................ 2008-273258

(51) Int. Cl.
*H02K 9/19*   (2006.01)
*H02K 41/02*   (2006.01)

(52) U.S. Cl.
USPC ..................................................... 310/12.15

(58) Field of Classification Search
USPC ................. 310/12.21, 12.29, 15–16
See application file for complete search history.

(56) References Cited

U.S. PATENT DOCUMENTS

| | | | | |
|---|---|---|---|---|
| 4,788,477 | A | * | 11/1988 | Teramachi .................... 318/135 |
| 5,717,262 | A | * | 2/1998 | Muller et al. ............... 310/60 A |
| 6,339,269 | B1 | | 1/2002 | Hsiao ............................... 310/64 |
| 6,789,305 | B2 | * | 9/2004 | Seki et al. ......................... 29/596 |
| 6,822,350 | B2 | * | 11/2004 | Hoppe ...................... 310/12.29 |
| 2003/0141769 | A1 | | 7/2003 | Kubo ............................. 310/12 |
| 2004/0070288 | A1 | | 4/2004 | Seki et al. ...................... 310/12 |
| 2004/0130223 | A1 | | 7/2004 | Nimz et al. .................... 310/58 |
| 2005/0067144 | A1 | * | 3/2005 | Chou .......................... 165/80.3 |
| 2005/0253465 | A1 | * | 11/2005 | Takenaka et al. ............... 310/52 |

FOREIGN PATENT DOCUMENTS

| | | | | |
|---|---|---|---|---|
| DE | 19802482 A1 | * | 7/1999 | ............. C23C 14/34 |
| JP | 10-255750 | | 9/1998 | |
| JP | 2000-228860 | | 8/2000 | |
| JP | 3643273 | | 2/2005 | |
| JP | 3856057 | | 9/2006 | |

OTHER PUBLICATIONS

International Search Report of International PCT Application No. PCT/JP2009/005604, dated Jan. 12, 2010.

* cited by examiner

*Primary Examiner* — Tran Nguyen
(74) *Attorney, Agent, or Firm* — J.C. Patents

(57) ABSTRACT

A linear motor coil assembly includes a base plate (1), a line of iron cores affixed longitudinally on the upper surface of the base plate, multiple coils respectively provided for the iron cores, and a first cooling tube being in contact with contacts the multiple coils and through which a first refrigerant passes. The lower surface of the base plate can be attached to a precision table of a machine tool or a semiconductor manufacturing apparatus. A groove (8) that extends longitudinally in linear fashion is formed on the lower surface of the base plate. A second cooling tube (92, 94), through which a second refrigerant passes, provided within the groove is additionally provided in the linear motor coil assembly.

2 Claims, 7 Drawing Sheets

LINEAR MOTOR COIL ASSEMBLY WITH COOLING DEVICE

CROSS-REFERENCE TO RELATED APPLICATION

This application claims the priority benefit of Japan application serial no. 2008-273258, filed Oct. 23, 2008. The entirety of the above-mentioned patent application is hereby incorporated by reference herein and made a part of this specification.

BACKGROUND OF THE INVENTION

1. Field of the Invention

The present invention relates to a linear motor producing linear movement, and more particularly to a linear motor coil assembly having armature coils, arranged in the direction of the linear movement, and a device for cooling the armature coils.

2. Description of Related Art

In the field of a machine tool or a semiconductor manufacturing device, a linear motor for high-precision positioning of a precision table already exists. The linear motor requires a large thrust, and, in most cases, is enclosed by a cover capable of preventing intrusion of dust. Therefore, effective cooling of the linear motor becomes important.

In an existing linear motor, a cooling tube enabling refrigerant to run through is close to or in contact with armature coils which are a heat source. Patent document 1 discloses a linear motor having two lines of coils and four flat cooling tubes. The flat cooling tubes are in contact with two of the four sides of each coil. Patent document 2 discloses a linear motor having one flat cooling tube extending around two lines of coils. The flat cooling tube is in contact with two of the four sides of each coil.

Patent document 3 discloses a linear motor coil assembly including a flat cooling tube winding in one line of coils. An iron core formed with coils is affixed to a base plate. The flat cooling tube has a width larger than or equal to the axial length of the coil. Most part of the surface of each coil is in contact with the flat cooling tube.

DOCUMENTS IN THE PRIOR ART

Patent Documents
Patent Document 1: Japanese Patent Gazette No. 3856057
Patent Document 2: Japanese Laid-Open Patent Gazette No. 2000-228860
Patent Document 3: Japanese Patent Gazette No. 3643273

However, a part of the side surface of the coil is not in contact with the flat cooling tube. Therefore, residual heat is transferred to the precision table through the iron core and the base plate, possibly resulting in adverse effects on the positioning precision of the precision table.

SUMMARY OF THE INVENTION

Accordingly, the present invention is directed to a linear motor having a simple structure, so as to effectively reduce adverse effects on the positioning precision of a precision table caused by heat.

A linear motor coil assembly includes a base plate (1), a line of iron cores (42) affixed longitudinally on the upper surface of the base plate, multiple coils (44) respectively provided for the iron cores (42), and a first cooling tube (50) being in contact with the multiple coils (44) and through which a first refrigerant passes; and the lower surface of the base plate can be attached on the precision table.

The base plate (1) has a groove (8) extending longitudinally in a linear fashion on the lower surface of the base plate, and the linear motor coil assembly further includes second cooling tubes (92, 94) provided in the groove (8), through which a second refrigerant passes.

In the linear motor coil assembly according to Technical Solution 1, the first cooling tube (50) preferably includes a flat cooling tube zigzagging along the multiple coils (44), and the second cooling tube (92, 94) preferably includes a linear flat cooling tube.

Effects of the Invention

In the linear motor coil assembly according to the present invention, heat generated by the coils is eliminated from the coil assembly through the first refrigerant. In addition, residual heat in the coils is transferred to the second cooling tube through the iron cores and the base plate, and the heat is then eliminated from the base plate by means of the second refrigerant in the second cooling tube. Moreover, the temperature of the precision table is kept fixed, and no processing is carried out on the precision table.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
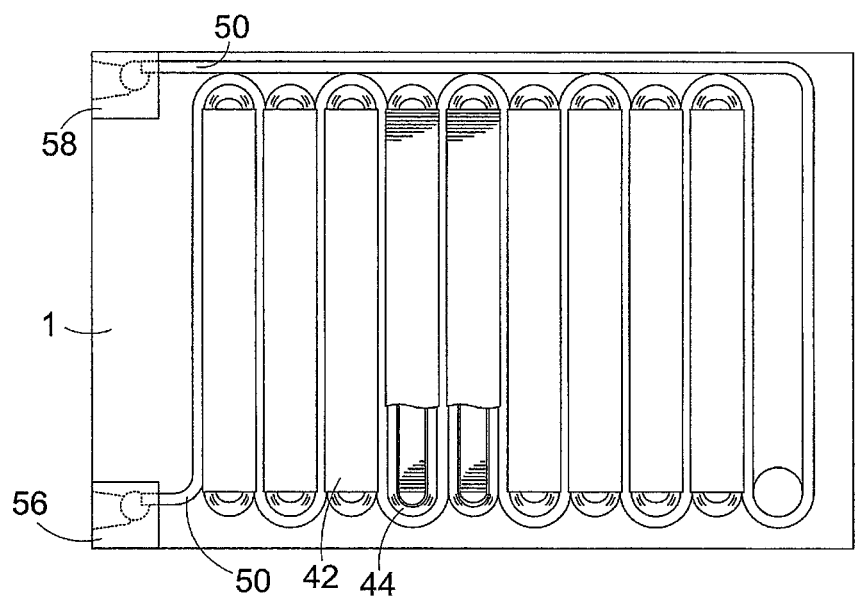
FIG. 1 is a side view of a linear motor coil assembly not covered by insulation resin according to the present invention.

Reference will now be made in detail to the present embodiments of the invention, examples of which are illustrated in the accompanying drawings. Wherever possible, the same reference numbers are used in the drawings to refer to the same or like parts.

Figure 2:
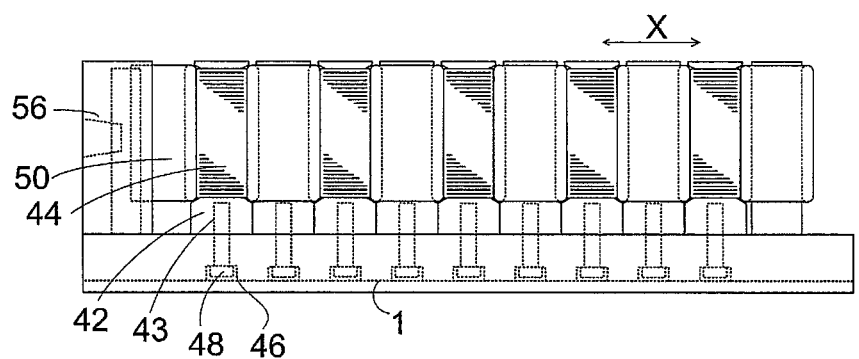
FIG. 2 is a top view of the linear motor coil assembly according to FIG. 1.
Figure 3:
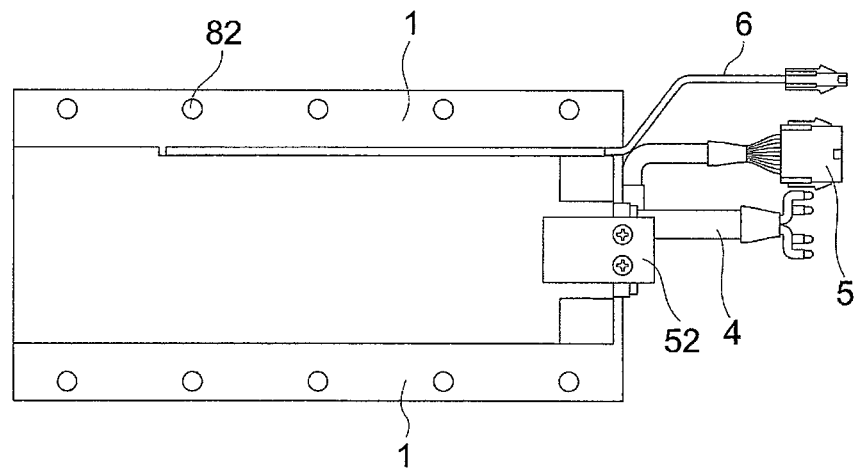
FIG. 3 is a top view of the linear motor coil assembly covered by insulation resin according to the present invention.
Figure 4:
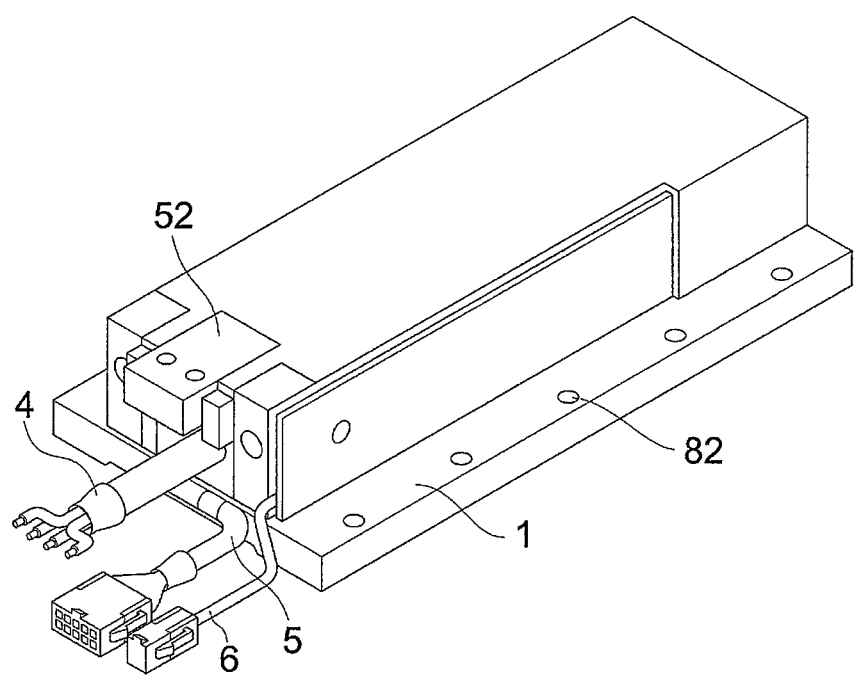
FIG. 4 is a perspective view of the linear motor coil assembly according to FIG. 1 seen from above on the right.
Figure 5:
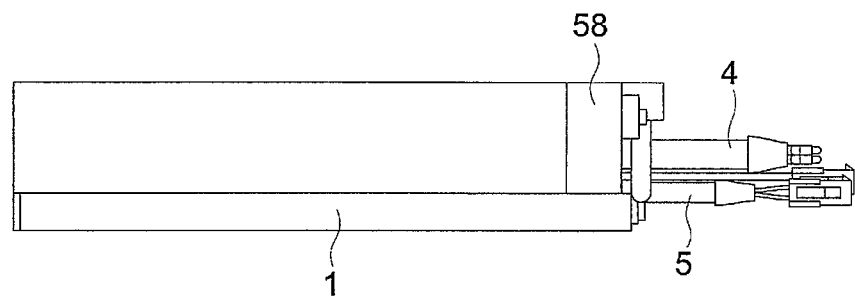
FIG. 5 is a side view of the linear motor coil assembly according to FIG. 1.
Figure 6:
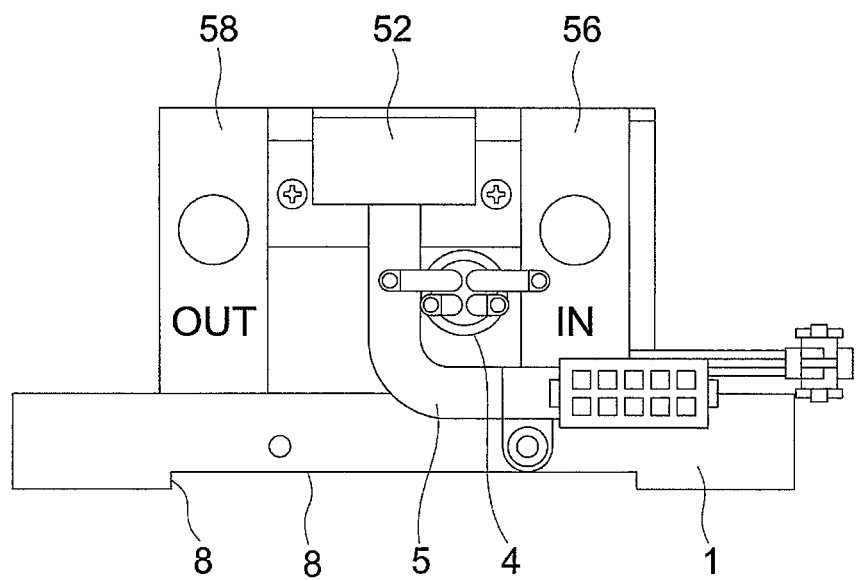
FIG. 6 is a front view of the linear motor coil assembly according to FIG. 1.

The linear motor coil assembly according to the present invention is further described with reference to the accompanying drawings. As shown in FIGS. 1 and 2, the coil assembly has a base plate 1 and multiple iron cores 42. The linear motor producing movement in the X-axis direction includes a moving body and a fixing body; and the coil assembly forms one of the moving body and the fixing body.

The iron cores 42 are formed by laminated silicon steel plates and separated according to each magnetic pole. Each iron core 42 is formed with a plurality of coils 44. Preferably, as shown in FIG. 1, the iron cores 42 are mounted into a line in the X-axis direction on the upper surface of the base plate 1 by means of screws 48. The base plate 1 is formed with holes 46 for the screws 48. The iron cores 42 are formed with holes 43 for the screws 48.

Preferably, as shown in FIG. 2, a flat cooling tube 50 is configured along the coils 44 in a zigzagging manner. The flat cooling tube 50 is manufactured through extrusion of aluminum. The height of the flat cooling tube 50 is equal to or slightly larger than that of the coils 44. The flat cooling tube 50 is in contact with most part of the outside surface of the coils 44 which are a heat source. The flat cooling tube 50 is formed with a plurality of through holes through which the refrigerant passes. The flat cooling tube 50 does not have branches, so no stagnation occurs to the flowing of the refrigerant. Heat produced in the coils 44 is immediately cooled by the refrigerant in the flat cooling tube 50.

A pair of manifolds 56, 58 are arranged and fixed at one end of the base plate 1. One end of the flat cooling tube 50 is soldered to the manifold 56, and the other end is soldered to the manifold 58. The refrigerant is introduced from a supply source into the manifold 56. In the zigzagging flat cooling tube 50, the refrigerant in the multiple coils passes from one end of the base plate 1 towards the other end thereof, namely, from the left side to the right side in the drawings. Finally, the refrigerant is linearly transported from the other end of the base plate 1 to the manifold 58, and immediately discharged outside the coil assembly.

All harnesses are placed outside the base plate 1, so the iron cores 42, the coils 44, and the flat cooling tube 50 cover a case-shaped mould frame. Insulation resin is injected into the mould frame, and then the solidified rectangular shaped object is finished into a predetermined size. FIGS. 3, 4, 5, and 6 show the coil assembly covered by the insulation resin according to the method. A steering sensor 52 is disposed on the coil assembly between the manifolds 56 and 58. Reference numbers 4, 5, and 6 in the drawings respectively represents a harness for coils, a harness for steering sensors, and a harness for temperature sensors.

The lower surface of the base plate 1 can be connected to a precision table in a machine tool or a semiconductor manufacturing device. A plurality of screw holes 82 for mounting the base plate 1 onto the precision table is formed along the opposite sides of the base plate 1. The lower surface of the base plate 1 is formed with a linear groove 8 across the full length thereof. The groove 8 is formed with a silicon film with good thermal conductivity.

Figure 7:
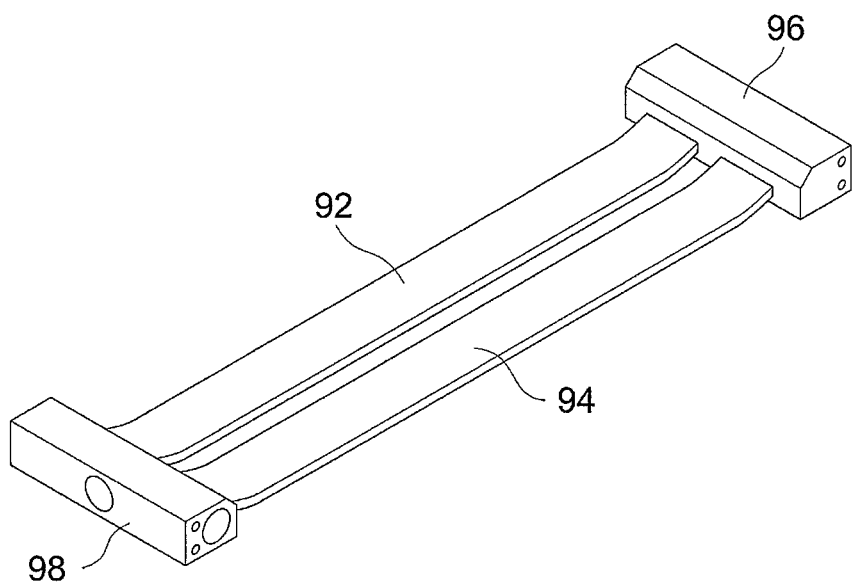
FIG. 7 is a perspective view of an added cooling device.
Figure 8:
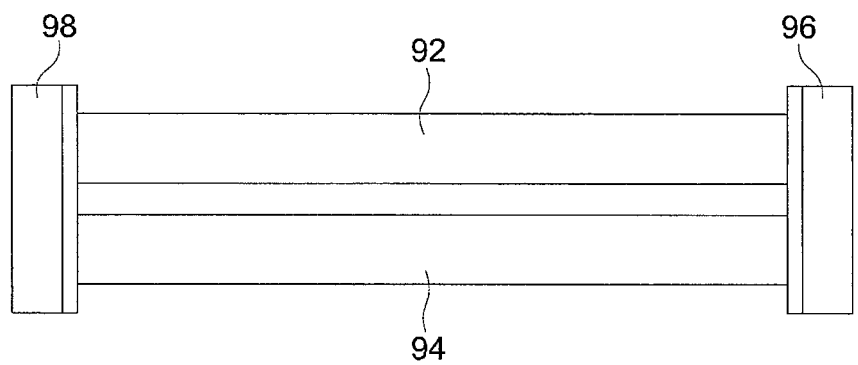
FIG. 8 is a top view of the added cooling device according to FIG. 7.
Figure 9:
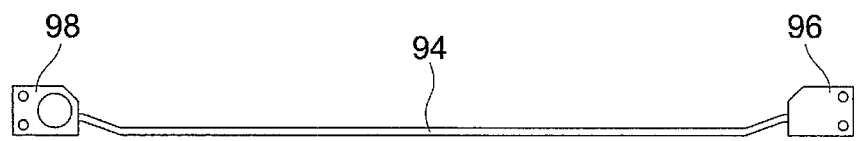
FIG. 9 is a side view of the added cooling device according to FIG. 7.

As shown in FIGS. 7, 8, and 9, an added cooling device has a pair of flat cooling tubes 92, 94 disposed on the groove 8. The added cooling device further has a pair of manifolds 96, 98. The flat cooling tubes 92, 94 are arranged in parallel and extend between the pair of manifolds 96, 98. The flat cooling tubes 92, 94 are manufactured by aluminum alloy. Both ends of the flat cooling tubes 92, 94 are fixed to the manifolds 96, 98 by means of aluminum brazing. The flat cooling tubes 92, 94 have a thickness of about 3 mm.

The flat cooling tubes 92, 94 linearly extend in the groove 8, so a temperature difference in the refrigerant is minimized in the flat cooling tubes 92, 94. The flat cooling tubes 92, 94 are designed in a manner of being embedded in the groove 8. The pair of flat cooling tubes 92, 94 may also be replaced by one or more than three flat cooling tubes embedded in the groove 8. However, for the strength and manufacturing efficiency of the aluminum flat cooling tubes, the pair of flat cooling tubes 92, 94 is chosen in this embodiment.

Figure 10:
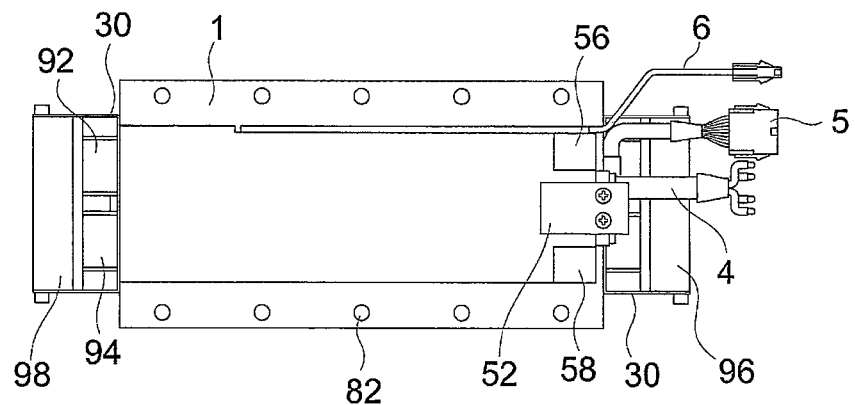
FIG. 10 is a top view of a linear motor coil assembly provided with the added cooling device.
Figure 11:
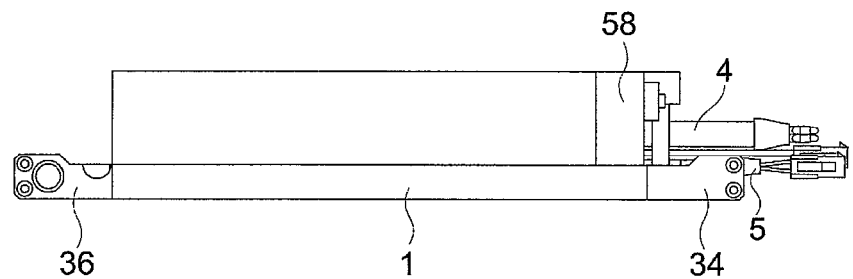
FIG. 11 is a side view of the linear motor coil assembly according to FIG. 10.
Figure 12:
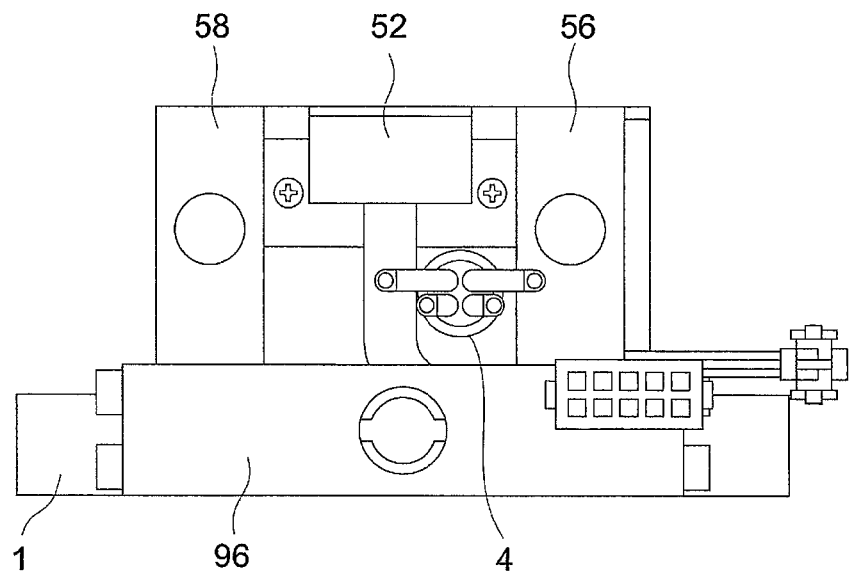
FIG. 12 is a front view of the linear motor coil assembly according to FIG. 10.
Figure 13:
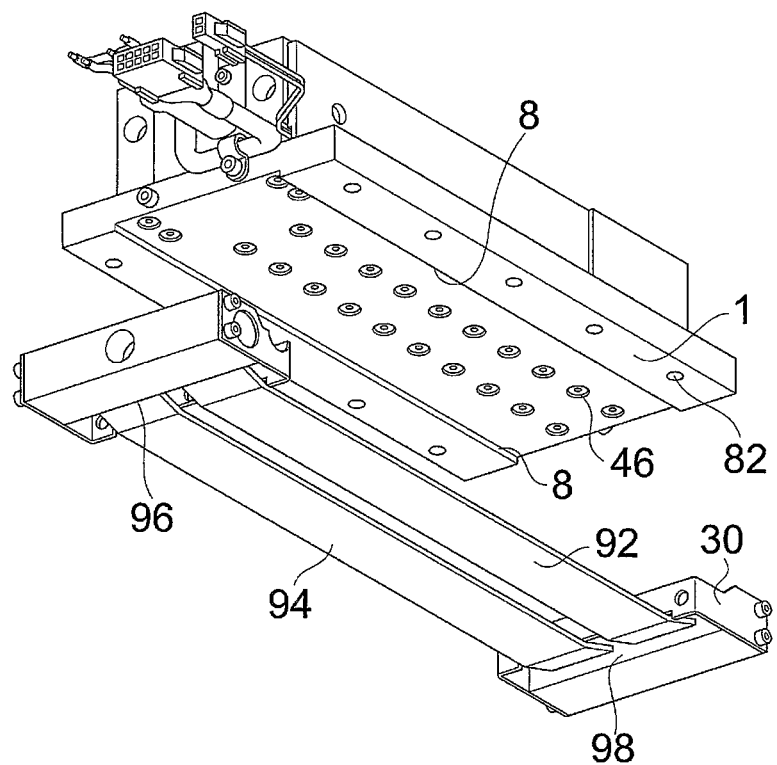
FIG. 13 is an exploded view of the linear motor coil assembly according to FIG. 10.

FIGS. 10, 11, 12, and 13 show the coil assembly provided with the added cooling device. Preferably, as shown in FIG. 10, the manifold 96 for introducing the refrigerant is mounted at one end of the base plate 1 by means of the mounting appliance 30. The manifold 98 for discharging the refrigerant is mounted at the other end of the base plate 1 by means of the mounting appliance 30.

Figure 14:
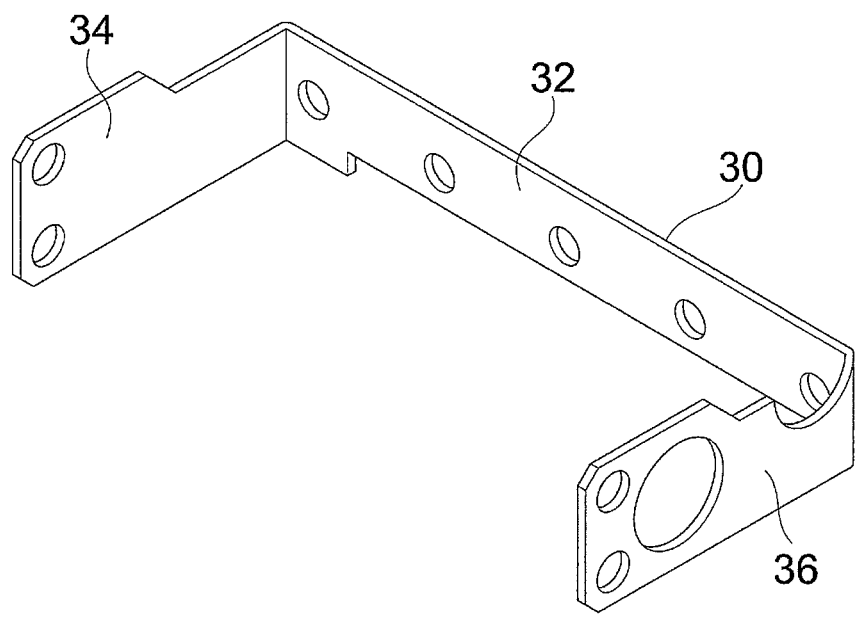
FIG. 14 is a perspective view of a mounting appliance for the added cooling device.

As shown in FIG. 14, the mounting appliance 30 has a U-shape, and includes a body portion 32 and parallel hook portions 34, 36. The body portion 32 has a length almost the same as that of the manifolds 92, 96. As shown in FIG. 10, the mounting appliance 30 is mounted at both ends of the base plate 1 by means of the body portion 32. Next, the manifolds 92, 96 are mounted on the mounting appliance 30 by means of the hook portions 34, 36.

The first refrigerant is introduced from the supply source into the manifold 56. The second refrigerant is introduced from the same or other supply sources into the manifold 96. Heat generated by the coils 44 is eliminated from the coil assembly by means of the first refrigerant. The residual heat in the coils 44 is transferred to the flat cooling tubes 92, 94 through the iron cores 42, the base plate 1, and the silicon film. The second refrigerant in the flat cooling tubes 92, 94 eliminates the heat from the base plate 1, and keeps the precision stable at a fixed temperature. The refrigerant is immediately discharged outside the coil assembly through the manifold 98.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A linear motor coil assembly, comprising a base plate comprising an upper surface and a lower surface, a line of iron cores affixed longitudinally on one of the upper and lower surfaces of the base plate, multiple coils respectively provided for the iron cores, and a first cooling tube being in contact with the multiple coils, and a first refrigerant passes through the first cooling tube, and the first cooling tube being set higher than the multiple coils, wherein
the base plate comprises a groove extending longitudinally in linear fashion on the other surface of the base plate, and the linear motor coil assembly further comprises a second cooling tube provided in the groove, and a second refrigerant passes through the second cooling tube.

2. The linear motor coil assembly according to claim 1, wherein the first cooling tube comprises a flat cooling tube zigzagging along the multiple coils, and the second cooling tube comprises a linear flat cooling tube.

* * * * *